(12) United States Patent
Nefcy et al.

(10) Patent No.: US 9,701,304 B2
(45) Date of Patent: Jul. 11, 2017

(54) CLUTCH CONTROL TO ENTER POWERSPLIT HYBRID POWERTRAIN PARALLEL MODE

(71) Applicant: FORD GLOBAL TECHNOLOGIES, LLC, Dearborn, MI (US)

(72) Inventors: Bernard D. Nefcy, Novi, MI (US); Marvin P. Kraska, Dearborn, MI (US); Daniel S. Colvin, Farmington Hills, MI (US); Walter J. Ortmann, Saline, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 44 days.

(21) Appl. No.: 14/880,483

(22) Filed: Oct. 12, 2015

(65) Prior Publication Data

US 2016/0031439 A1 Feb. 4, 2016

Related U.S. Application Data

(62) Division of application No. 14/284,612, filed on May 22, 2014, now Pat. No. 9,187,086.

(51) Int. Cl.
*B60W 10/02* (2006.01)
*B60W 20/40* (2016.01)
(Continued)

(52) U.S. Cl.
CPC ............. *B60W 20/40* (2013.01); *B60K 6/387* (2013.01); *B60K 6/445* (2013.01); *B60W 10/02* (2013.01); *B60W 10/08* (2013.01); *B60W 20/00* (2013.01); *B60W 20/20* (2013.01); *F16D 48/06* (2013.01); *B60K 6/383* (2013.01); *B60W 2510/0208* (2013.01); *B60W 2510/0657* (2013.01); *B60W 2510/081* (2013.01); *B60W 2710/021* (2013.01); *B60W 2710/081* (2013.01); *F16D 41/069* (2013.01); *Y02T 10/6239* (2013.01); *Y10S 903/946* (2013.01); *Y10T 477/26* (2015.01); *Y10T 477/753* (2015.01)

(58) Field of Classification Search
CPC .. Y10T 477/26; Y10T 477/753; B60W 20/40; B60W 10/02; B60W 10/08; B60W 20/20; B60W 2510/081; B60W 2710/081; B60W 2510/0657; B60W 2710/021; B60W 2510/0208; B60K 6/445; B60K 6/387; B60K 6/383; F16D 48/06; F16D 41/069; Y10S 903/946
See application file for complete search history.

(56) References Cited

U.S. PATENT DOCUMENTS 4,507,985 A 4/1985 Morimoto et al.
6,834,750 B2 12/2004 Baker et al.
(Continued)

*Primary Examiner* — Roger Pang
(74) *Attorney, Agent, or Firm* — David B. Kelley; MacMillan, Sobanski & Todd, LLC

(57) ABSTRACT

A selectively actuatable one-way clutch is controlled to brake or release a generator such that a powersplit hybrid powertrain enters or exits a parallel mode of operation. To brake the generator and enter the parallel mode, the clutch is activated while overrunning the generator before the generator is slowed to engage the clutch. To release the generator and exit the parallel mode, the generator is controlled to overrun the clutch before deactivating the clutch and returning the generator to a base speed control.

11 Claims, 4 Drawing Sheets

(51) Int. Cl.
*B60W 20/20* (2016.01)
*F16D 48/06* (2006.01)
*B60K 6/387* (2007.10)
*B60W 10/08* (2006.01)
*B60K 6/445* (2007.10)
*B60W 20/00* (2016.01)
B60K 6/383 (2007.10)
F16D 41/069 (2006.01)

(56) References Cited

U.S. PATENT DOCUMENTS

| | | |
|---|---|---|
| 8,317,648 B2 | 11/2012 | Robinette et al. |
| 8,370,034 B2 | 2/2013 | Kumazaki et al. |
| 8,409,053 B2 | 4/2013 | Samie et al. |
| 8,425,377 B2 | 4/2013 | Liang et al. |
| 2008/0058154 A1* | 3/2008 | Ashizawa ................ B60K 6/36 477/5 |
| 2011/0177900 A1* | 7/2011 | Simon .................... B60K 6/445 475/5 |
| 2012/0142472 A1* | 6/2012 | Samie .................... B60K 6/383 475/5 |
| 2012/0241274 A1 | 9/2012 | Lloyd |
| 2015/0080174 A1* | 3/2015 | Lee ....................... B60W 10/02 477/5 |
| 2016/0339908 A1* | 11/2016 | Komada ................ B60K 6/383 |
| 2016/0375754 A1* | 12/2016 | Kurosaki ............... B60K 6/383 475/5 |
| 2017/0009820 A1* | 1/2017 | Itagaki ................... F16D 41/04 |

\* cited by examiner ated of U.S. patent application Ser. No. 14/284,612, filed May 22, 2014, which is incorporated herein by reference.

CLUTCH CONTROL TO ENTER POWERSPLIT HYBRID POWERTRAIN PARALLEL MODE

CROSS REFERENCE TO RELATED APPLICATIONS

The present patent application claims the benefit of and is a divisional of U.S. patent application Ser. No. 14/284,612, filed May 22, 2014, which is incorporated herein by reference.

BACKGROUND OF INVENTION

The present invention relates to a method of controlling an automotive powertrain and in particular to using a selectively actuatable one-way clutch to enter and exit a parallel mode of operation for a powersplit powertrain.

An automotive vehicle may use a powersplit hybrid electric powertrain. Included in the powersplit powertrain is an electric generator, which may also alternatively operate as an electric motor. The powersplit powertrain may be operated in a plurality of modes, including negative powersplit, positive powersplit, and parallel modes. In the positive powersplit mode the generator operates and produces electrical power. In the negative powersplit mode the generator consumes electrical power and produces a torque to propel the vehicle. In the parallel mode the generator neither produces nor consumes electrical power, which allows the vehicle to be propelled by a combined torque produced by the engine, a second electric motor, and braking of the generator. Typically, a friction clutch is used to brake the generator so that the powertrain may enter the parallel mode.

However, time required to brake the generator to enter the parallel mode reduces fuel efficiency for the powersplit powertrain. The friction clutch may require a hydraulic system with a pump to maintain pressure to keep the friction clutch braking the generator. The pump creates an additional load on the powertrain and may further reduce fuel efficiency.

SUMMARY OF INVENTION

An embodiment contemplates a method of controlling a powersplit hybrid vehicle powertrain. A generator is rotated to overrun a selectively actuatable one-way clutch coupled to the generator. The clutch is electronically activated while overrunning. The generator is slowed to engage the activated clutch. The clutch is engaged when the generator has slowed to an engagement speed. Torque is transferred from the generator to the engaged clutch before turning off the generator.

Another embodiment contemplates a method of controlling a powersplit hybrid vehicle powertrain of a vehicle. A stopped generator is turned on while a selectively actuatable one-way clutch coupled to the generator is activated and engaged. The stopped generator is rotated in a disengagement direction to overrun and disengage the clutch. The clutch is deactivated while overrunning.

An advantage of an embodiment is expediting control of the one-way clutch when the powersplit powertrain enters a parallel operating mode. This improves fuel efficiency for a vehicle using the powersplit powertrain.

DETAILED DESCRIPTION

Figure 1:
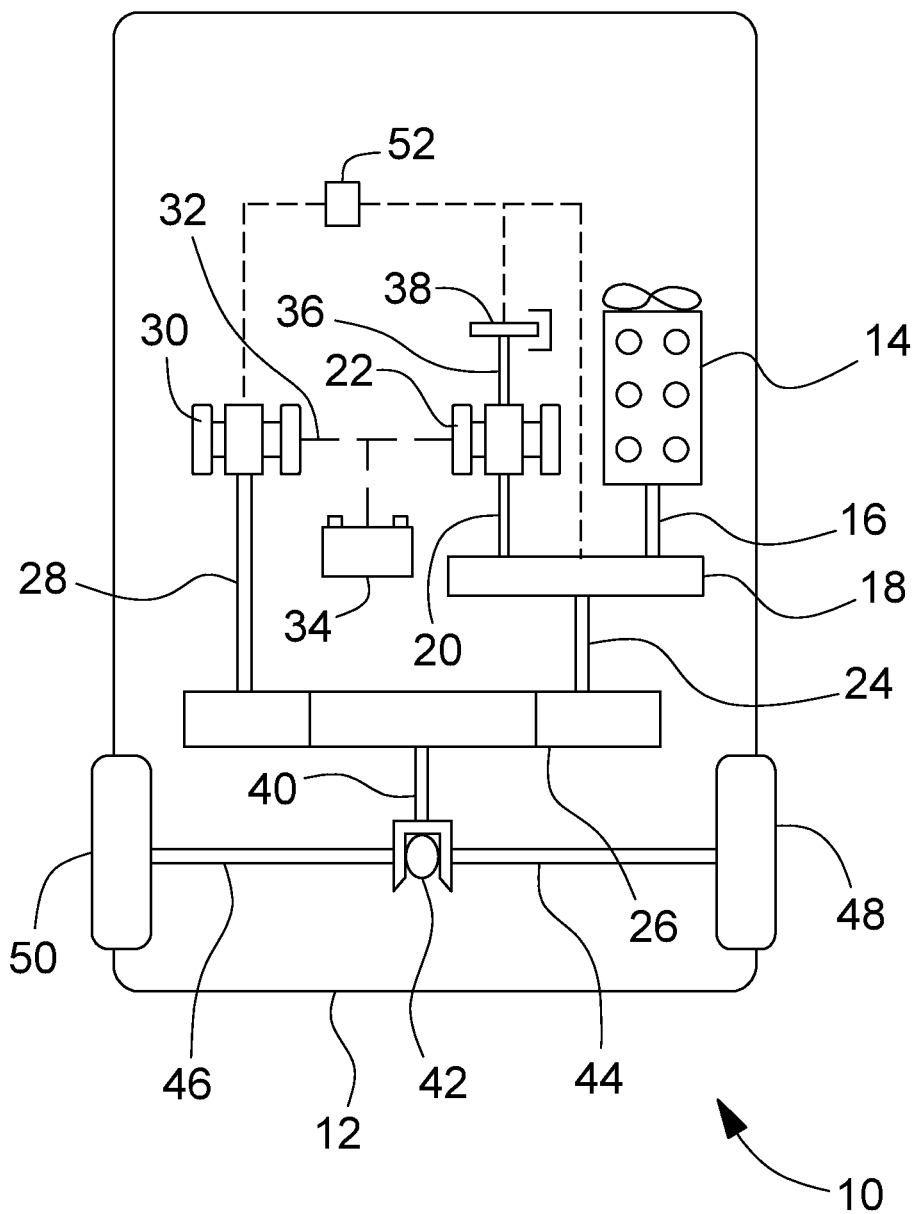
FIG. 1 is a schematic view of a hybrid electric powertrain.

FIG. 1 schematically illustrates a powersplit type hybrid electric powertrain 10 for an automotive vehicle 12. The powertrain 10 is merely exemplary, and may take other forms, such as front wheel drive, rear wheel drive, and all wheel drive types of powertrains.

The powertrain 10 includes an internal combustion engine 14 powering a crankshaft 16. The crankshaft 16 transmits torque from the engine 14 to a planetary gear set 18. Also connected to transmit torque to and from the planetary gear set 18, via a generator shaft 20, is a generator 22. The planetary gear set 18 comprises a sun gear, ring gear, and carrier assembly, which can be conventional and so the specifics of this gear set are omitted from FIG. 1 for clarity. The crankshaft 16 connects to the carrier assembly and the generator shaft 20 connects to the sun gear. The ring gear transmits torque, via a first gearing input 24, to a gearing 26. Also connected to the gearing 26, via a second gearing input 28, is an electric motor 30. The generator 22 and the motor 30 are connected via a high voltage bus 32 to a battery 34. The generator 22 is also connected via a brake shaft 36 to a selectively actuatable one-way clutch (OWC) 38. The gearing 26 transmits torque via a gearing output 40 to a differential 42. The differential 42 transmits torque, via first and second axles 44 and 46, respectively, to rotate first and second wheels 48 and 50, respectively. Operation of the powertrain 10, including the engine 14, generator 22, motor 30, and one-way clutch 38, is controlled by a controller 52. The controller 52 may be a vehicle speed controller (VSC), which controls the powertrain 10 to regulate a speed of the vehicle 12.

As described, the powertrain 10 may operate in a positive powersplit mode in which the generator 22 operates and produces electrical power. For example, electrical current produced by the generator 22 may power the motor 30 or charge the battery 34. Alternatively, the powertrain 10 may operate in a negative powersplit or parallel mode. In the negative powersplit mode the generator 22 consumes electrical power to rotate and produce a generator torque that propels the vehicle 12. For example, electrical power consumed by the generator 22 may come from the motor 30 (operating to generate electric power) or the battery 34. In the parallel mode the generator 22 neither produces nor consumes electrical power. The powertrain 10 operates in the parallel mode when the one-way clutch 38 brakes the generator 22 from rotating. Once braked from rotating, and having torque transferred to the clutch 38, the generator 22 may be turned off. In the parallel mode, torque is supplied to the gearing 26 from the engine 14 and the motor 30. The parallel mode allows both the engine 14 and the motor 30 to propel the vehicle 12.

Figure 2:
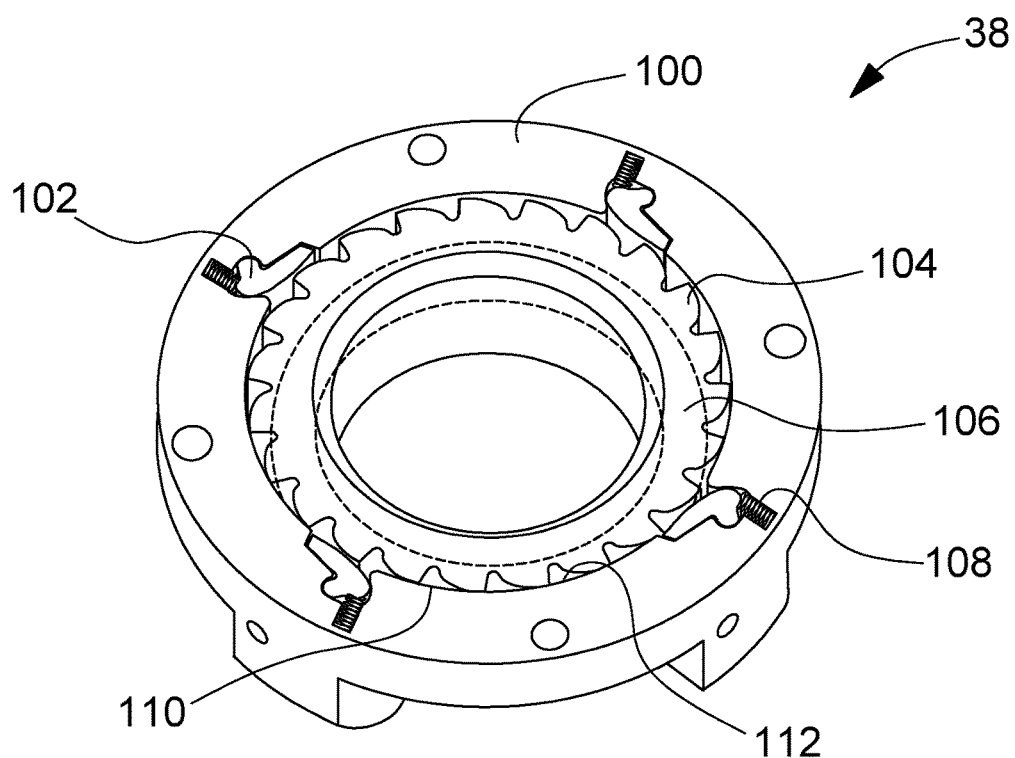
FIG. 2 is a schematic, perspective view of a one-way clutch.

FIG. 2 illustrates the one-way clutch 38. The one-way clutch 38 comprises a rocker plate 100 having pockets 108 that each contain a corresponding rocker 102, which are pivotally hinged within the pockets 108. The clutch 38 also includes a cam plate 104, which has a plurality of notches 112 that define teeth. The teeth can selectively catch fingers extending from the rockers when the rockers 102 are pivoted to extend the fingers radially inward. The rocker plate 100 is connected to and rotates with the brake shaft 36, and the cam plate 104 is secured to the vehicle 12 to prevent rotation of the cam plate 104. For example, the cam plate 104 may be bolted to a casing for the clutch 38.

Figure 3:
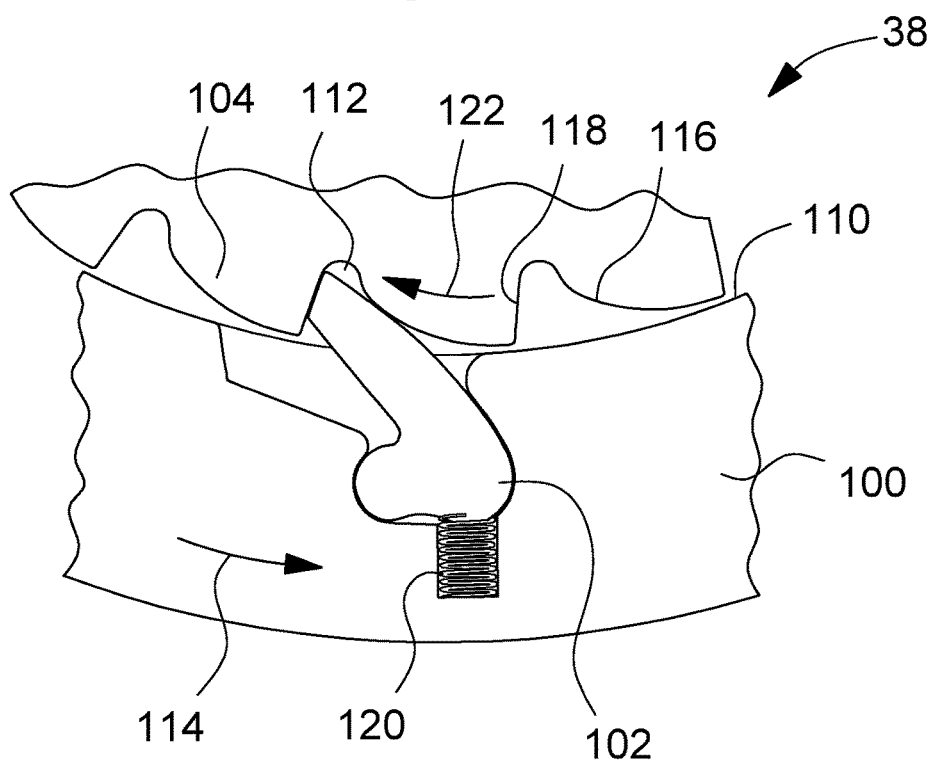
FIG. 3 is a schematic view of a portion of the one-way clutch.

The cam plate 104 contains a coil 106 that may be selectively energized to produce a magnetic force. As illustrated in FIG. 2, the clutch 38 is in a deactivated state, in which the fingers of the rockers 102 are pivoted to a radially outer position in the rocker plate recesses and thus the fingers do not engage the teeth of the cam plate 104. When the clutch 38 is in the deactivated state, the rockers 102 fit within the pockets 108 without protruding beyond a radially inside face 110 of the rocker plate 100. The rockers are biased by a spring 120 to remain within the pockets 108 without protruding (a bias in a counterclockwise direction as illustrated in FIGS. 2 and 3). When the clutch 38 is deactivated (i.e., the coil 106 is not energized), no torque is transferred between the rocker and cam plates 100 and 104, respectively. The clutch 38 is activated by energizing the coil 106. The magnetic force that results from electrifying the coil 106 pivots the fingers of the rockers 102 out of the pockets 108, against the bias of the spring 120, such that the fingers protrude beyond the radially inside face 110 of the rocker plate 100.

As understood by one skilled in the art, the rockers 102 may alternatively be hinged from the cam plate 104, the pockets 108 correspondingly located in the cam plate 104, the notches 112 located in the rocker plate 100, and the coil 106 located in the rocker plate 100.

FIG. 3 illustrates the clutch 38 in an activated state. The fingers of the rockers 102 extend beyond the inside surface 110 of the rocker plate 100 and are pivotally biased towards the notch 112 of the cam plate 104. As discussed, the clutch 38 is a selectively actuatable one-way clutch. When the clutch 38 is activated and the rocker plate 100 rotates in a disengagement direction 114, the fingers of the rockers 102 will be cammed outward by the teeth and so will not engage with the teeth to prevent rotation. Rather, as the rocker plate 100 rotates, a plurality of first cam surfaces 116 deflect the fingers of the rockers 102 toward the pockets 108.

Alternatively, when the clutch 38 is activated and the rocker plate 100 attempts to rotate in an engagement direction 122, opposite the disengagement direction 114, the fingers of the rockers 102 engage with a second engagement surface 118 of the teeth and the clutch 38 is engaged. The mechanical engagement between the cam and rocker plates 104 and 100, respectively, prevents rotation of the rocker plate 100. The mechanical engagement is sufficient such that, if the coil 106 of the clutch 38 is deactivated, the clutch 38 remains engaged to prevent rotation. De-energizing the coil 106 once the clutch 38 is engaged, which deactivates the rockers 102, reduces discharge of the battery 34 while still preventing rotation of the rocker plate 100. Since the rocker plate 100 is rotationally fixed to the generator 22, braking the rocker plate 100 from rotating also prevents the generator 22 from rotating.

Rotation of the rocker plate 100 may be changed from the disengagement direction 114 to the engagement direction 122 by slowing rotation in the disengagement direction 114 to a second stop before commencing rotation in the engagement direction 122. Rotation in the engagement direction 122 may then be accelerated from the second stop to the desired speed. Rotation of the rocker plate 100 may be changed from the engagement direction 122 to the disengagement direction 114 by slowing rotation in the engagement direction 122 to a stop before commencing rotation in the disengagement direction 114. Similarly, rotation in the disengagement direction 114 may then be accelerated from the stop to a desired speed. A time period between stopping and commencing rotation of the rocker plate 100 may vary and may be minimized so as to be imperceptible to a driver of the vehicle 12.

The engaged clutch 38 may be disengaged by rotating the rocker plate 100 in the disengagement direction 114. With or without the coil 106 of the clutch 38 being activated, when the rocker plate 100 is rotated in the disengagement direction 114, no engagement occurs between the rocker and cam plates 100 and 104, respectively, thus allowing the rocker plate 100 to freely rotate. When the coil 106 of the clutch 38 is deactivated, allowing the springs to pivot the fingers away from engagement with the teeth, the rocker plate 100 may be freely rotated in the disengagement direction 114 and engagement direction 122.

Figure 4A:
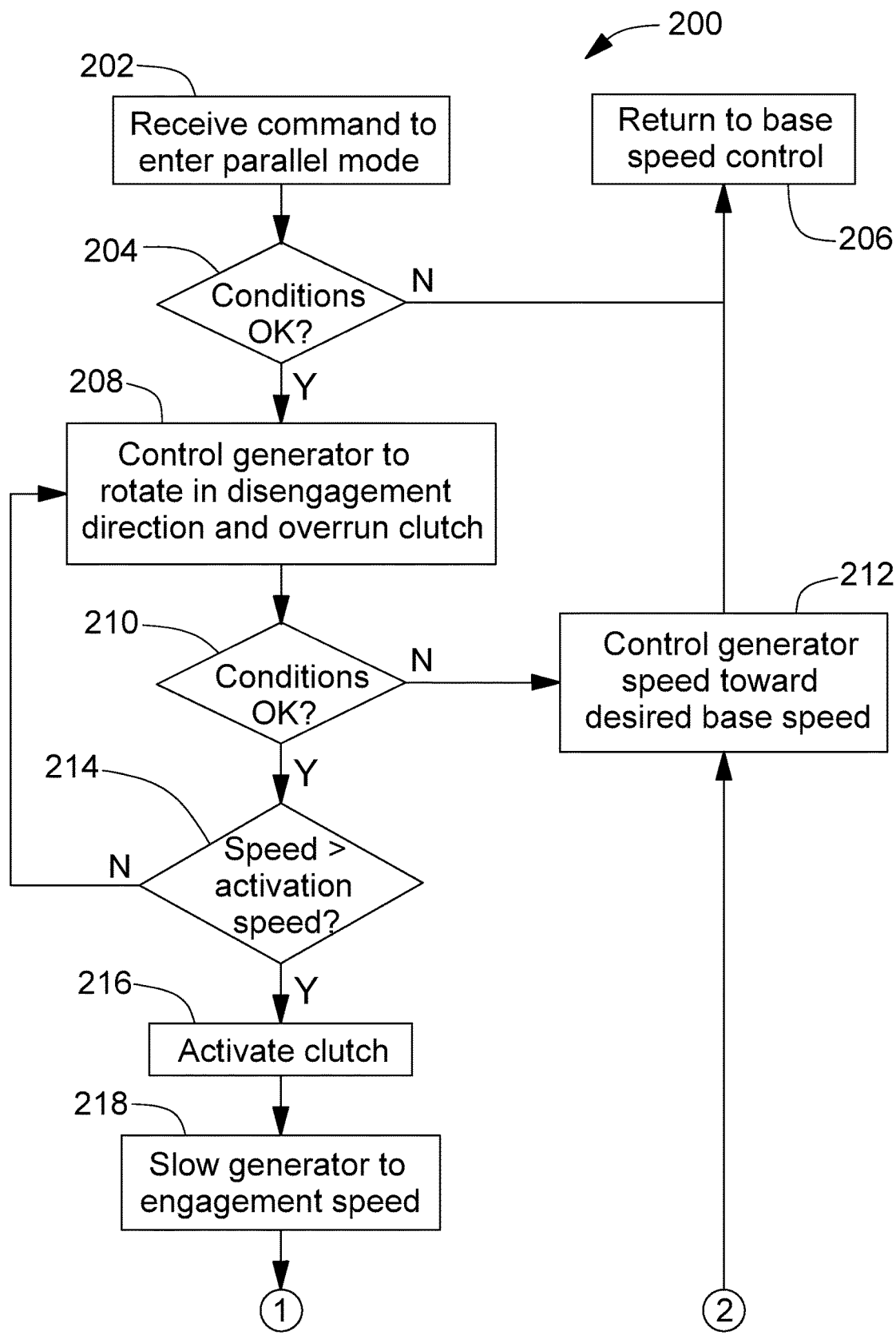
FIGS. 4A and 4B are a flow chart of a control routine for a hybrid electric powertrain.
Figure 4B:
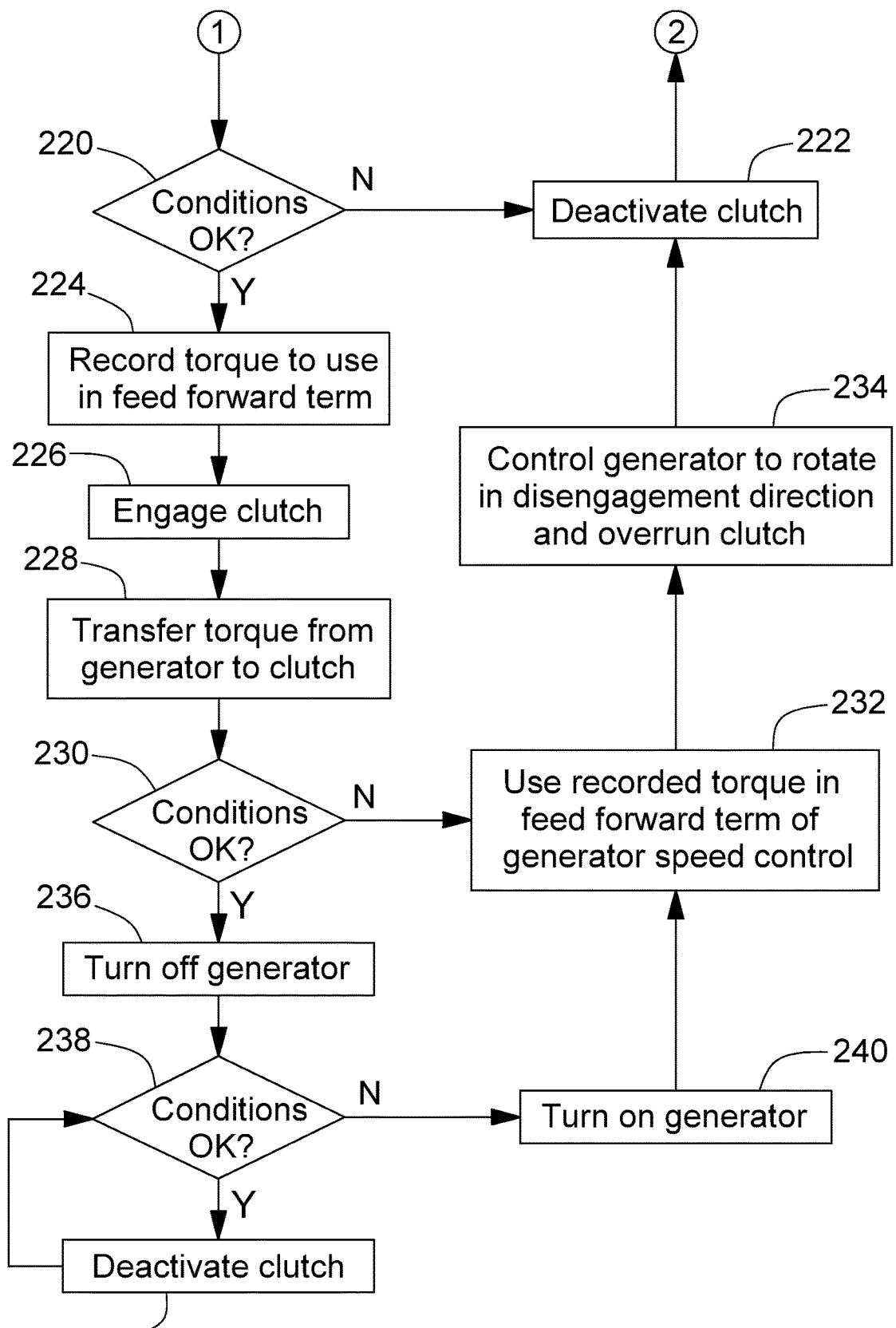

FIGS. 4A and 4B will now be discussed with reference to FIGS. 1-3. FIGS. 4A and 4B illustrates a control routine 200 for the powertrain 10 when entering or exiting the parallel mode.

In a step 202, the controller 52 receives a command to enter the parallel mode. The controller 52 determines, in a step 204, whether conditions are acceptable to enter the parallel mode. One such condition is that the entry command has not been cancelled or overridden. For example, a command to exit the parallel mode would override the entry command. Other conditions may include one or more of the following: that the engine 14 is delivering a requested torque through an engine power PI (proportional, integral) controller; the engine 14 is operating in a power range that will produce efficiency gains from entering the parallel mode; actual and commanded speeds of the engine 14 are close to an engagement speed for engaging the one-way clutch 38; the actual and commanded speeds of the engine 14 are above a lug limit speed for minimizing noise, vibration, and harshness effects; or discharge limits and a state of charge for the battery 34 are within nominal ranges. If the conditions are not acceptable, generator 22 returns to a base speed control routine in a step 206. If the conditions are acceptable, in a step 208, the generator 22 is rotated in the disengagement direction 114 to overrun the clutch 38. The conditions are monitored throughout the routine 200.

Following the step 208, the conditions are again verified to be acceptable in a step 210. If the conditions are no longer acceptable, the generator 22 is rotated toward a desired speed in a step 212 before the step 206. If the conditions continue to be acceptable, the controller 52 determines in a step 214 if a current speed of the generator is greater than an activation speed for the clutch 38. The activation speed is a speed at which the generator 22 is overrunning the clutch 38—i.e., the rocker plate 100 is overrunning the cam plate 104 in the disengagement direction 114. Exceeding the activation speed may require rotation of the generator 22 be changed from the engagement direction 122 to the disengagement direction 114. If the current speed is not greater than the activation speed, then the routine 200 returns to the step 208. If the generator speed is greater than the clutch activation speed, then in a step 216, the clutch 38 is activated. The generator 22 is then slowed from overrunning to the engagement speed. The engagement speed may be zero or close to zero.

The generator 22 may rotate to the activation speed to overrun the clutch 38, the clutch 38 activates, and then the generator 22 slows from the activation speed to the engagement speed. Alternatively, the generator 22 may rotate to overrun the clutch 38 at a peak overrunning speed, the generator 22 slows from the peak overrunning speed to the activation speed, the clutch 38 activates, and then the generator 22 slows from the activation speed to the engagement speed. Increasing the peak overrunning speed additionally ensures the generator 22 is overrunning the clutch 38. Setting the activation speed at less than the peak overrunning speed delays activation of the clutch 38. Delayed activation of the clutch 38 avoids, when the conditions are no longer acceptable, needing to deactivate the clutch 38 prior to the generator 22 being returned to the base speed control routine.

As the generator 22 is slowing to the engagement speed, in a step 220, verification is made that the conditions remain acceptable. If the conditions are not acceptable, the clutch 38 is deactivated in a step 222 before the steps 212 and 206. If the conditions remain acceptable, the routine 200 proceeds to a step 224.

Just prior to when the clutch 38 is engaged to transfer torque from the generator 22, a current torque for at least one of the generator 22 or the clutch 38 may be recorded in a step 224. The recorded torque may be used in a feed forward term of a torque computation for controlling, in part, the generator 22. The feed forward term uses the torque recorded in the step 224 to predict a torque required to produce the desired speed. For example, the torque recorded in the step 224 may be used to set a starting torque for returning the generator 22 to the base speed control routine after a condition is found to be unacceptable. In the step 226, the clutch 38 is engaged and, in a step 228, torque is transferred from the generator 22 to the clutch 38 to brake the generator 22 to a stop. Once the generator 22 is braked to a stop, the parallel mode is active.

In a step 230, verification is made that the conditions remain acceptable. If the conditions are not acceptable, the recorded torque is used in the feed forward term to control rotation of the generator 22 before the steps 232, 234, 222, 212, and 206. If the conditions remain acceptable, the generator 22 is turned off in the step 236.

An additional verification of the conditions occurs in a step 238. If the conditions are not acceptable, the generator 22 is turned on in a step 240 before the steps 232, 234, 222, 212, and 206. If the conditions are acceptable, then the clutch 38 may be deactivated in a step 242. Deactivating the clutch 38 after the generator is braked and turned off conserves charge of the battery 34. The clutch 38 may be deactivated when the clutch 38 is mechanically engaged with the generator 22.

After the clutch 38 is deactivated, the control routine 200 returns to the step 238 to monitor that the conditions remain acceptable. As discussed, the command to exit the parallel mode would be an unacceptable condition. Alternatively, if the step 242 is not included in the control routine 200, when conditions are acceptable in the step 238, the control routine 200 may iterate the step 238 to monitor that conditions remain acceptable.

While certain embodiments of the present invention have been described in detail, those familiar with the art to which this invention relates will recognize various alternative designs and embodiments for practicing the invention as defined by the following claims.

The invention claimed is:

1. A method of controlling a powersplit hybrid powertrain comprising:
   turning on a stopped generator while a selectively actuatable one-way clutch coupled to the generator is activated and engaged;
   rotating the stopped generator in a disengagement direction to overrun and disengage the clutch;
   deactivating the clutch while overrunning; and
   wherein an engine torque is used to predict a starting torque for returning the generator to a base speed control routine.

2. The method of claim 1 in which, after the clutch is disengaged and deactivated, placing the generator under control of a speed controller.

3. The method of claim 1 in which deactivating the clutch comprises de-energizing a coil in a cam plate so that a spring biasing force pivots fingers of rockers in a rocker plate inward to pockets in the rocker plate, the rocker plate being connected to the generator and the cam plate being secured to prevent rotation of the cam plate.

4. The method of claim 3 in which rotation of the clutch in the disengagement direction does not transfer torque between the rocker and cam plates and rotation in an engagement direction, opposite the disengagement direction, transfers torque between the rocker and cam plates when the clutch is activated and does not transfer torque between the rocker and cam plates when the clutch is deactivated.

5. The method of claim 3 in which disengaging the clutch comprises the fingers mechanically separating from with engagement surfaces of the cam plate.

6. The method of claim 1 in which the speed is for the generator to overrun the clutch.

7. The method of claim 1 in which the speed is sufficient to operate the generator under the base speed control routine.

8. A method of controlling a powersplit hybrid powertrain comprising:
   turning on a stopped generator while a selectively actuatable one-way clutch coupled to the generator is activated and engaged;
   rotating the stopped generator in a disengagement direction to overrun and disengage the clutch;
   deactivating the clutch while overrunning; and
   wherein deactivating the clutch comprises de-energizing a coil in a cam plate so that a spring biasing force pivots fingers of rockers in a rocker plate inward to pockets in the rocker plate, the rocker plate being connected to the generator and the cam plate being secured to prevent rotation of the cam plate.

9. The method of claim 8 in which rotation of the clutch in the disengagement direction does not transfer torque between the rocker and cam plates and rotation in an engagement direction, opposite the disengagement direction, transfers torque between the rocker and cam plates when the clutch is activated and does not transfer torque between the rocker and cam plates when the clutch is deactivated.

10. The method of claim 8 in which disengaging the clutch comprises the fingers mechanically separating from with engagement surfaces of the cam plate.

11. The method of claim 8 in which an engine torque is used to predict a starting torque for returning the generator to a base speed control routine.

* * * * *